J. L. KOLBE.
KNOCKDOWN BOX.
APPLICATION FILED JAN. 26, 1921.

1,432,563. Patented Oct. 17, 1922.

Inventor
John L. Kolbe,
By
Attorney

Patented Oct. 17, 1922.

1,432,563

UNITED STATES PATENT OFFICE.

JOHN L. KOLBE, OF WAUWATOSA, WISCONSIN.

KNOCKDOWN BOX.

Application filed January 26, 1921. Serial No. 440,026.

*To all whom it may concern:*

Be it known that JOHN L. KOLBE, a citizen of the United States of America, residing at Wauwatosa, in the county of Milwaukee and State of Wisconsin, has invented new and useful Improvements in Knockdown Boxes, of which the following is a specification.

The object of the invention is to provide a simple and inexpensive form of knockdown box or container suitable for use in shipping cheeses and other products from the producer to the market and adapted to be packed and crated in compact form for return to the producer, as a means of economizing containers by repeated re-use and of returning the containers for such re-use within the minimum space and hence at the minimum cost of transportation; and with this object in view the invention consists in the construction and combination of parts of which a preferred embodiment is shown in the accompanying drawings, wherein:

Figure 5:
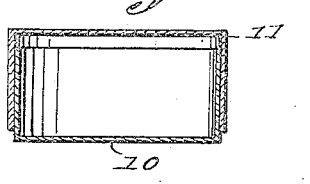
Figure 5 is a detail sectional view of one of the boxes or containers of a round or cylindrical form.
Figure 7:
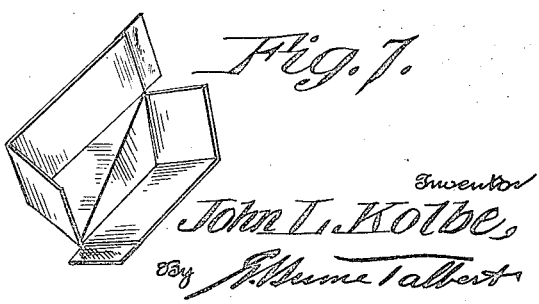
Figure 7 is a similar view of a rectangular form of box element.

The box or container consists essentially of the telescoping elements 10 and 11, respectively representing the body and the cover adapted to be fitted together as shown in Figure 5 in the manner common to cheese boxes and the like and whereas in said form of box the side wall is cylindrical, it should be understood that the invention is not limited to such form but is applicable equally to boxes of a rectangular form as indicated in Figure 7, whether square or of equal dimensions laterally and longitudinally, or elongated or of oblique form as indicated in Figure 7.

Figure 1:
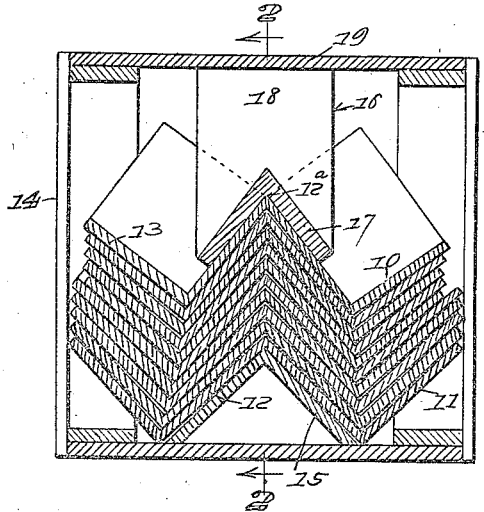
Figure 1 is a sectional view of a stack of nested boxes or containers crated for re-shipment as empties.
Figure 2:
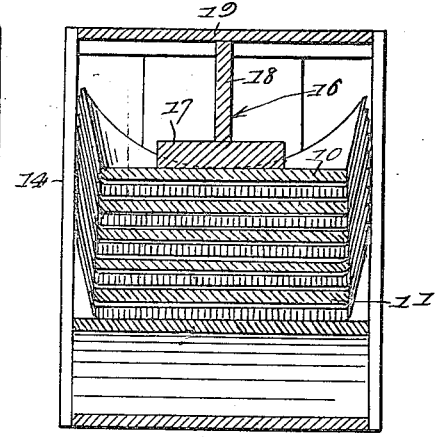
Figure 2 is a similar view taken on the plane indicated by the line 2—2 of Figure 1.
Figure 3:
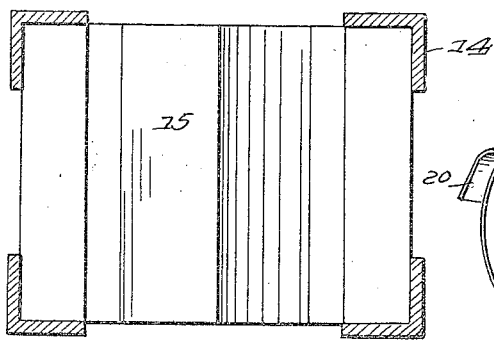
Figure 3 is a plan view showing the crate in section.
Figure 4:
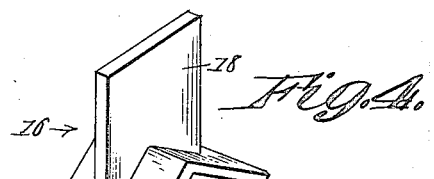
Figure 4 is a detail view of a follower used in connection with the crate.
Figure 6:
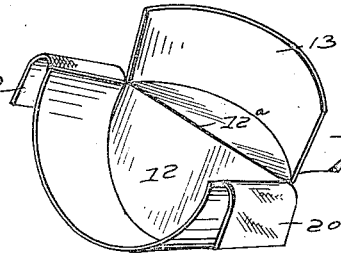
Figure 6 is a perspective view of one of the box or container elements.

Each of said box elements, namely the body and the cover, either of which may be represented by the illustration in Figure 6, owing to the fact that said box and body are of corresponding construction except as to the diametrical dimensions, is diametrically split through the side walls from the free edges to the base represented by the disk 12, the sections 13 of said side walls thus respectively representing one half of the contour of the box or container and adapted to be spread apart as indicated in Figure 6 upon a diametrical fold line 12$^a$ in the disk forming the base, whether this base represents the bottom of the box or the corresponding member of the cover. This fold line may be formed by bending or doubling the disk or in any preferred or equivalent manner, to the end that the sections of the disk base are adapted to lie in angular relations as shown in Figure 6 and also as indicated in Figure 1, so that the elements of the box may be nested in close relation for ultimate enclosure in a crate such as that illustrated in Figures 1 to 3 inclusive at 14. Preferably the crate is provided in its bottom with a V-shaped form of spreader 15 and also with a follower 16 designed to be super-imposed upon the uppermost box member as shown in Figures 1 and 2, said follower having a V-shaped head 17 and a stem 18 upon the extremity of which the cover 19 of the crate may bear.

The body and cover elements of a plurality of boxes may thus be nested and enclosed within a single sheet in such compact and space economizing relations as to provide for re-shipment or return to the producer at the minimum freight rates and under conditions insuring the safe transportation thereof, and to the end that the elements may be set up and arranged for immediate use upon receipt at the factory or producing point, the sections of the walls of the elements are provided with tapes 20, preferably of flexible and suitably of textile material arranged so as to overlap the adjacent end of the complemental wall sections to which they may be attached either adhesively or otherwise as may be found desirable in practice.

Obviously with reference to boxes designed for the shipment of cheese and like commodities the folding and nesting characteristic of the box as described adapts it to be forwarded in compact and economical form from the box maker to the producer who may then set up the elements and unite them to enclose and protect the product, with a minimum of effort and expenditure of time upon the part of the workmen or help.

As above noted the utilization of this method of collapsing and nesting is not limited to boxes having cylindrical side walls but is equally applicable to boxes having a rectangular form such as that indicated in Figure 7 and which has an advantage over the folding or knock-down pasteboard boxes now in common use in that the joints of the receptacle when set up are of very much more rigid and strain resisting quality than is possible to secure with a box in which folding is effected at the angles between the elements of the side walls and between the side walls and the bottom or disk constituting the base. The only joints required in connection with a box constructed as herein described are those provided between the sections of the diametrically split side walls which are amply reinforced when the box is set up by the overlapping tapes which serve as securing means. In practice it is also preferable in fitting the complemental elements of the container together to dispose the joints of the two elements in different planes and preferably in planes perpendicular to each other.

The invention having been described, what is new and useful is:

1. A collapsible box adapted to be arranged in nested relation with similar boxes, and comprising a bottom and side walls of which the latter are split in the plane of a diametrically fold line in the base, and adapted to be brought into abutting relation at said slits, and flexible textile tapes arranged to overlap the abutting sections of said wall sections and secured thereto.

2. The combination with a plurality of knock-down boxes having bottoms formed with diametrically fold lines and side walls split on said fold lines whereby they are adapted for nested relation in cross sectionally V-shaped form, of a container provided in its bottom with an inverted V-shaped spreader adapted for the reception of the bottom of the lowermost container, and provided at its top with a follower having a V-shaped head engaging the inner surface of the bottom of the uppermost box, and a stem carrying said head and depending from the top of the crate.

In testimony whereof he affixes his signature.

JOHN L. KOLBE.